United States Patent Office 2,908,578
Patented Oct. 13, 1959

2,908,578

WAX EMULSION POLISHES

Graham Barker, Newark, N.J., assignor, by mesne assignments, to Witco Chemical Company, Inc., New York, N.Y., a corporation of Delaware No Drawing. Application February 12, 1957
Serial No. 639,610

18 Claims. (Cl. 106—8)

My invention relates to waxy emulsion polishes and waxy compositions for use therein.

Waxy emulsion polishes, for the polishing of surfaces such as wooden floors, rubber tile, vinyl and other plastic tile, furniture, automobiles, glass surfaces, and the like, generally comprise an emulsion in which water constitutes the external phase and waxy hydrophobic materials, notably carnauba wax, alone or in admixture with other waxes, and/or plastics or resins, with or without plasticizers, constitute the inner phase. Such polishes commonly contain ammonia for desired control of pH, and morpholine soaps of oleic acid, or other soaps or various synthetic surface active agents for emulsification purposes. Typical examples of waxy emulsion polishes are disclosed, for instance, in U.S. Letters Patent Nos. 2,483,259; 2,597,871; 2,598,666; and 2,626,870.

While, in general, such polishes have numbers of desirable properties, and are sold in very large quantities, their manufacture frequently introduces difficulties in that formulation procedures must be rigidly followed and controlled. Concerning the products themselves, they frequently leave much to be desired in the way of adequate gloss, leveling properties, water resistance and hardness of the waxy film, particularly in connection with the deposition of the waxy coating on certain types of surfaces.

I have discovered that material improvements in waxy emulsion polishes can be obtained by the incorporation thereinto of certain chemical compounds. These improvements manifest themselves in one or more of the following ways depending, among other things, on the particular compositions of the waxy emulsion polishes into which said chemical compounds are incorporated: excellent leveling action on various types of surfaces, including rubber tile and vinyl tile surfaces, particularly without adverse effect on gloss, water resistance and waxy film hardness; improved and enlarged leeway in formulation including, in the case of certain waxy polish emulsion compositions wherein alkali-soluble resins such as shellac and the like were necessary, the ability to reduce the quantity of such resins or, if desired, eliminate them entirely; improvement in gloss; and the production of waxy films which are more easily renewed. These and other advantages, it will be understood, do not necessarily inhere all together in all waxy emulsion polish compositions but it will be found that one or more of said advantages will be obtained in waxy emulsion polish compositions generally.

The chemical compounds which are utilized in the wax or waxy compositions of my invention are reaction products of water-soluble amines with specific types of derivatives of alcohol amines and which may be characterized as alcohol non-tertiary (that is, primary or secondary) amines, a reactive hydrogen of said amines being replaced by a fatty acid acyl radical containing at least 8, usually from 8 to 24, and especially from 12 to 18, carbon atoms, and a different reactive hydrogen of said amines being replaced by an acyl radical of a polycarboxylic acid radical, for instance, the maleic acid radical

—OC—CH=CH—COOH

The water-soluble amines utilized in the preparation of the aforesaid reaction products can be selected from a large group typical of which are monomethylamine, diethylamine, n-propylamine, isopropylamine, morpholine, methoxy propyl amine, monoethanolamine, diethanolamine, triethanolamine, 2 - amino - 2 - methyl - 1-propanol, propanolamine, isopropanolamines, 1-amino-2,3-propanediol, glycerol monoamine, glycerol diamine, 2-amino-2-methyl-1,3-propanediol, and the like, and mixtures of any two or more thereof. The amines may be of the volatile type or nonvolatile type. The nonvolatile amines, such as the hydroxyalkyl amines, for instance, monoethanolamine, diethanolamine and triethanolamine, may be used where water resistance is not of especial concern. Of particular utility for most purposes are morpholine and methoxy propyl amine and mixtures thereof.

The compounds with which the water-soluble amines are reacted may further be subdivided into two groups, corresponding to the following formulae:

(1)  R—CO—NH—X—OCO—Y(—COOM)$_n$ and (2)  R—CO—O—X—NH—CO—Y(—COOM)$_n$ where R—CO— is a fatty acyl radical containing at least 8 and especially from 12 to 18 carbon atoms, X is the carbon-hydrogen residue of an alcohol primary or secondary amine, especially monoethanolamine and monoisopropanolamine, Y is the residue of a polycarboxylic acid, especially an aliphatic dicarboxylic acid, and $n$ is 1, 2 or 3.

The acyl radical (R—CO—) is derived from oils or fats, hydrogenated or not, such as coconut oil, babassu oil, corn oil, castor oil, linseed oil, fish oils, cottonseed oil, soya bean oil, palm nut kernel oil, tall oil, rosin acids such as abietic acid, and the like, or fatty acids and other higher molecular weight or long chain carboxylic acids such as lauric acid, myristic acid, palmitic acid, stearic acid, oleic acid, linoleic acid and commercial mixtures of such acids predominant in content of a desired one or ones of said acids, or acylating derivatives of such acids as, for example, the acyl chlorides thereof. The acyl radical derived from oleic acid is especially desirable.

The alcohol primary and secondary amines, particularly water-soluble hydroxy-alkyl primary amines, which are utilized to form the higher fatty acid ester or amide linkage in the molecule in the preparation of said compounds can be selected from a large group, typical or illustrative examples of which are monoethanolamine, monopropanolamine, diethanolamine, isopropanolamine, monobutanolamine, isobutanolamine; 1-amino-2,3-propanediol; 2-amino-1,3-propanediol; diglycerolamine; 2 - amino - 2-methyl-1,3-propanediol; 2-amino-2-n-propyl-1,3-propanediol; and 2-amino-2-isopropyl-1,3-propanediol. Of especial utility are, as indicated above, monoethanolamine and monoisopropanolamine.

The polycarboxylic acids which are employed in the preparation of said compounds can be chosen from a large group, typical or illustrative examples of which are maleic acid, fumaric acid, tartaric acid, glutaconic acid, itaconic acid, adipic acid, phthalic acid, sebacic acid, citric acid, aconitic acid, tricarballylic acid, and glutaric acid. Of particular utility are the aliphtic dicarboxylic acids, especially the water-soluble dicarboxylic acids containing from 4 to 8 carbon atoms. The maleic acid derivatives are particularly preferred.

Illustrative examples of said compounds are the following (which include, also, the isomers thereof):

(1) 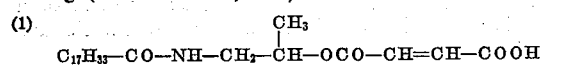
Maleic acid ester of the oleic acid amide of monoisopropanolamine (2) 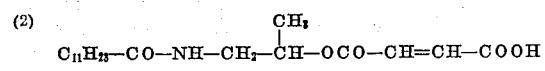
Maleic acid ester of the lauric acid amide of monoisopropanolamine (3) 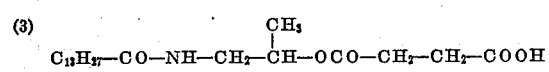
Succinic acid ester of the myristic acid amide of isopropanolamine (4) 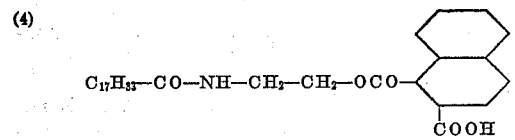
Phthalic acid ester of the oleic acid amide of monoethanolamine (5) $C_{15}H_{31}$—CO—NH—$CH_2$—$CH_2$—OCO—$(CH_2)_3$—COOH
Glutaric acid ester of the palmitic acid amide of monoethanolamine (6) 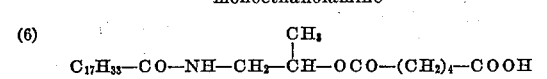
Adipic acid ester of the oleic acid amide of isopropanolamine (7) 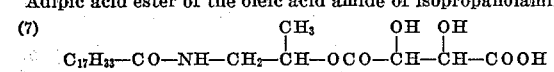
Tartaric acid ester of the oleic acid amide of isopropanolamine (8) 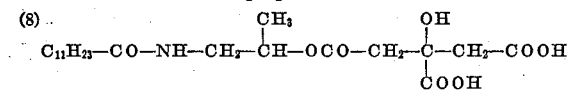
Citric acid ester of the lauric acid amide of isopropanolamine (9) $C_{15}H_{31}$—CO—NH—$CH_2$—$CH_2$—OCO—CH=CH—COOH
Maleic acid ester of the palmitic acid amide of monoethanolamine

(10) 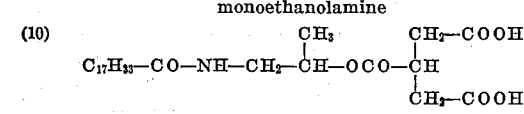
Tricarballylic acid ester of the oleic acid amide of isopropanolamine

(11) $C_{15}H_{31}$—CO—NH—$(CH_2)_3$—$CH_2$—OCO—CH=CH—COOH
Maleic acid ester of the palmitic acid amide of butanolamine

(12) 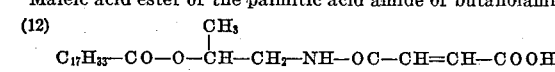
Maleic acid amide of the oleic acid ester of isopropanolamine

(13) 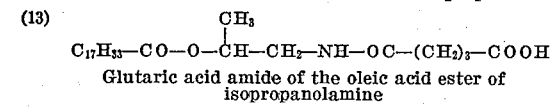
Glutaric acid amide of the oleic acid ester of isopropanolamine

(14) 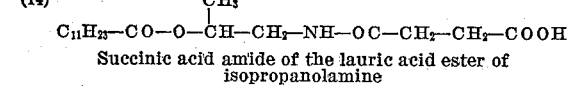
Succinic acid amide of the lauric acid ester of isopropanolamine

(15) 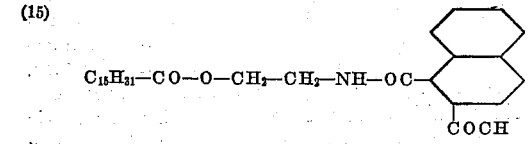
Phthalic acid amide of the palmitic acid ester of monoethanolamine

(16) 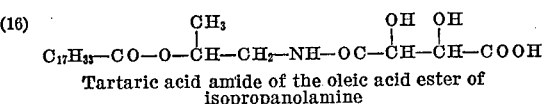
Tartaric acid amide of the oleic acid ester of isopropanolamine

(17) 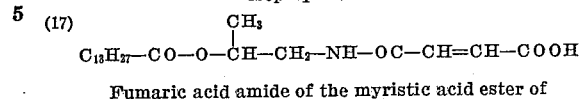
Fumaric acid amide of the myristic acid ester of isopropanolamine

(18) $C_{17}H_{33}$—CO—O—$CH_2$—$CH_2$—NH—OC—$(CH_2)_4$—COOH

Adipic acid amide of the oleic acid ester of monoethanolamine

(19) 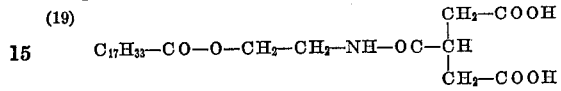
Tricarballylic acid amide of the oleic acid ester of monoethanolamine The chemical compounds which I employ as ingredients of my novel waxy polish emulsions are, as stated above, reaction products of the water-soluble amines with the aforesaid alcohol amine derivatives. The said reaction products may be prepared by simple admixture of the water-soluble amines, such as morpholine or methoxy propyl amine, or mixtures thereof, with the alcohol amine derivatives, either at room tmeperatures or slightly elevated temperatures as, for instnace, at 60 to 80 degrees C. or slightly higher. The proportions of said reactants are somewhat variable but will usually fall within the range of 1 to 1.5 or 2 or slightly more mols of the morpholine or methoxy propyl amine for each mol of the alcohol amine derivative. The reaction which takes place appears to be the formation of a salt, namely, in the particular illustrative instance, the morpholine or methoxy propyl amine salt of the alcohol amine compound, the morpholine or methoxy propyl amine serving to neutralize the free carboxyl groups present in the alcohol amine derivative. The said chemical compounds are most advantageously preformed and incorporated as such into the waxy polish emulsions. They may, however, be formed in situ in the production of the emulsions by adding the morpholine and/or the methoxy propyl amine and the alcohol amine polycarboxylic acid ester or amide derivative to the waxy polish emulsion ingredients in the mixing procedure.

In general, based on the solids content of the wax or waxy constituent or constituents, the water-soluble amine, illustratively the morpholine and/or methoxy propyl amine, reaction product with the aforesaid alcohol amine amide or ester polycarboxylic acid derivatives will comprise from about 5% to about 30% or, more commonly, from about 10% to about 20% and, in most cases, from about 12% to about 22% with a good average about 16 to 20%, although it will be understood that the proportions are somewhat variable.

The waxy polish emulsion compositions may comprise any of the many known types thereof or modifications of such compositions as, for instance, compositions such as are shown in the aforementioned typical patents. They may contain, as the waxy constituent (or mixture of constituents) natural and synthetic waxes as, for instance, carnauba wax, montan wax, candellila wax, ouricury wax, beeswax, ceresin wax, microcrystalline wax, oxidized microcrystalline waxes, sugar cane wax, Fischer-Tropsch waxes, or such waxy materials as polystyrene, polyethylene, shellac, and resins of various types, and mixtures of various of said materials, and such additions as plasticizers and the like. Usually, the waxy constituent or constituents comprise of the order of about 85% to 90%, by weight, of the solids content of the waxy polish emulsion, the balance being such materials as plasticizers, emulsifying agents, and the like. In most instances, the waxy constituent comprises a true wax, such as carnauba wax or candellila wax or mixtures thereof, but, more commonly, it comprises a mixture which includes a wax or waxes and a wax-miscible resin or resins such as phenolic resins, terpene phenolic resins, polystyrene, shellac or other resins; and, in certain instances, the waxy constituent may contain no wax proper at all but may comprise a resin, such as polystyrene, or a mixture of resins.

The plasticizers used are those commonly employed in waxy polish emulsions as, for instance, tributyl phosphate, dibutyl phosphate, tricresyl phosphate, dibutyl phthalate, dioctyl phthalate, dimethyl phthalate, diethyl phthalate, diphenyl phthalate, dibutyl tartrate, diamyl tartrate, methylphthalyl ethyl glycolate, tributyl citrate, diethylene glycol phthalate, dibutyl sebacate, dicyclohexyl phthalate, benzyl sebacate, tributyl carballylate, and the like.

As is usual in waxy emulsion polishes, the particle size is small, generally not materially exceeding 0.3 micron and, in the case of the so-called high gloss waxy emulsions, particle sizes of the general order of about 0.01 to 0.1 micron.

In the waxy polish emulsions of my invention, the chemical compounds which I incorporate therein, and which I have described in detail hereinabove, are used to replace, in whole or in part, particularly the former, such materials as the oleic acid morpholine soaps or other soaps or other previously suggested emulsifying agents, since they serve not only to achieve the functions of said soaps and emulsifying agents but, in addition, serve to impart the desirable properties described above but which are not obtained or obtainable through the use of said oleic acid morpholine soaps and said heretofore suggested emulsifying agents.

The following examples are illustrative of the practice of my invention. It will be understood that numerous other waxy polish emulsions and waxy compositions can be employed into which the previously described chemical compounds are incorporated, and the proportions of ingredients are also subject to variation. All parts listed are by weight.

*Example 1*

| | |
|---|---|
| Carnauba wax | 100 |
| Morpholine | 5 |
| Oleic acid amide of monoisopropanolamine maleate | 13.5 |
| Ammonium hydroxide (28% NH₃) | 3.5 |

Water in amount to make emulsion containing 11.5% to 12% solids.

*Example 2*

| | |
|---|---|
| Carnauba wax | 100 |
| Methoxy propyl amine | 5 |
| Oleic acid amide of monoethnolamine maleate | 13.5 |
| Ammonium hydroxide (28% NH₃) | 3.5 |

Water in amount to make emulsion containing 11.5% to 12% solids.

*Example 3*

| | |
|---|---|
| Emulsifiable polyethylene | 50 |
| Oxidized Fischer-Tropsch wax | 50 |
| Morpholine | 6 |
| Oleic acid amide of monoisopropanolamine maleate | 13.5 |
| Ammonium hydroxide (28% NH₃) | 4 |

Water in amount to make emulsion containing 11.5% to 12% solids.

*Example 4*

| | |
|---|---|
| Carnauba wax | 80 |
| Polystyrene latex (35% solids) | 60 |
| Tributyl phosphate | 1.5 |
| Dibutyl phthalate | 1.5 |
| Oleic acid amide of monoisopropanolamine aconitate | 11 |
| Morpholine | 5 |
| Ammonium hydroxide (28% NH₃) | 3 |

Water in amount to make emulsion containing 14% solids.

*Example 5*

| | |
|---|---|
| Carnauba wax | 70 |
| Phenol-formaldehyde resin (Durez 15546) | 30 |
| Morpholine | 5 |
| Oleic acid amide of monoisopropanolamine oleate | 9 |
| Ammonium hydroxide (28% NH₃) | 4 |

Water in amount to make emulsion containing 11.5 to 12% solids.

*Example 6*

| | |
|---|---|
| Carnauba wax | 20 |
| Polystyrene latex (35% solids) | 240 |
| Tributyl phosphate | 12 |
| Oleic acid amide of monoisopropanolamine maleate | 2.5 |
| Methoxy propyl amine | 1.0 |
| Ammonium hydroxide (28% NH₃) | .5 |

Water in amount to make emulsion containing 13% solids.

*Example 7*

| | |
|---|---|
| Carnauba wax | 100 |
| Oleic acid amide of monoisopropanolamine maleate | 10 to 15 |

*Example 8*

| | |
|---|---|
| Carnauba wax | 100 |
| Oleic acid ester of maleic acid amide of monoisopropanolamine | 10 to 15 |

*Example 9*

| | |
|---|---|
| Carnauba wax | 80 |
| Candellila wax | 20 |
| Oleic acid amide of monoisopropanolamine maleate | 10 to 15 |

*Example 10*

| | |
|---|---|
| Polystyrene latex (35% solids) | 280 |
| Oleic acid amide of monoisopropanolamine phthalate | 10 to 15 |

In the preparation of the waxy polish emulsions, various known mixing techniques can be employed such as the so-called wax to water method or the water to wax method. In the case of Examples 1 and 2, the wax or waxy constituent or constituents are melted, and the oleic acid amide of monoisopropanolamine maleate-morpholine and/or methoxy propyl amine or other water-soluble amine reaction product (or the said amide derivative and the water-soluble amine exemplified by morpholine and/or methoxy propyl amine each as such) is added at a temperature of about 195–200 degrees F. The water is then slowly added at about 210 degrees F., with agitation, and, after inversion, the remaining amount of water may be added more rapidly. The emulsion is allowed to cool, while agitating, and the aqueous ammonia is added thereto. In the case of Examples 3, 4, 5 and 6 the emulsions are prepared exclusive, for instance, of the resin or latex and, after the emulsion has been cooled down, the resin or latex is added, for example, from a stock solution thereof.

What I claim as new and desire to protect by Letters Patent of the United States is:

1. A wax composition having particular utility for the preparation of wax polish emulsions consisting essentially of a material selected from the class consisting of waxes and wax-like resins, and from 5% to 30%, by weight of said material, of a reaction product of (a) a water-soluble amine, and (b) a compound in the form of an amide of an alcohol non-tertiary amine wherein a reactive hydrogen of said amine is replaced by a fatty acid acyl radical containing from 8 to 24 carbon atoms, and wherein a different reactive hydrogen of said amine is replaced by an acyl radical of a polycarboxylic acid, said latter acyl radical being represented by the formula

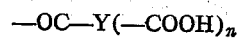

wherein Y is the residue of a polycarboxylic acid, and $n$ is an integer from 1 to 3.

2. A wax composition having particular utility for the preparation of wax polish emulsions consisting essentially of a material selected from the class consisting of waxes and wax-like resins, and from 5% to 30%, by weight of said material, of a reaction product of (a) a water-soluble amine, and (b) a compound corresponding to the formula R—CO—O—X—NH—OC—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a polycarboxylic acid, and $n$ is an integer from 1 to 3.

3. A wax composition having particular utility for the preparation of wax polish emulsions consisting essentially of a wax and from about 12 to about 22%, by weight of said wax, of a reaction product of (a) a water-soluble amine, and (b) a compound corresponding to the formula R—CO—NH—X—OCO—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a polycarboxylic acid, and $n$ is an integer from 1 to 3.

4. A wax composition having particular utility for the preparation of wax polish emulsions consisting essentially of a wax and from 5% to 30%, by weight of the wax, of a reaction product of (a) an amine selected from the group consisting of morpholine and methoxy propyl amine, and (b) a compound corresponding to the formula R—CO—NH—X—OCO—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a polycarboxylic acid containing from 4 to 8 carbon atoms, and $n$ is an integer from 1 to 3.

5. A wax composition having particular utility for the preparation of wax polish emulsions consisting essentially of carnauba wax and from 10% to 20%, by weight of said wax, of a reaction product of (a) an amine selected from the group consisting of morpholine and methoxy propyl amine, and (b) a compound corresponding to the formula R—CO—NH—X—OCO—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a water-soluble polycarboxylic acid containing from 4 to 8 carbon atoms, and $n$ is an integer from 1 to 3.

6. The wax composition of claim 5, wherein R—CO— is predominately the oleoyl radical.

7. A wax composition having particular utility for the preparation of wax polish emulsions consisting essentially of a wax and from 5% to 30%, by weight of the wax, of a reaction product of (a) a water-soluble amine, and (b) a compound corresponding to the formula

R—CO—NH—X—OCO—CH=CH—COOH where R—CO— is a fatty acid acyl radical containing from 12 to 18 carbon atoms, and X is the carbon-hydrogen residue of a hydroxy-alkyl primary amine selected from the group consisting of monoethanolamine and monoisopropanolamine.

8. A wax composition having particular utility for the preparation of wax polish emulsions consisting essential of carnauba wax and from 10% to 20%, by weight of said wax, of a reaction product of (a) an amine selected from the group consisting of morpholine and methoxy propyl amine, and (b) a compound corresponding to the formula

R—CO—NH—X—OCO—CH=CH—COOH where R—CO— is a fatty acid acyl radical containing from 12 to 18 carbon atoms, and X is the carbon-hydrogen residue of a hydroxy-alkyl primary amine selected from the group consisting of monoethanolamine and monoisopropanolamine.

9. The wax composition of claim 8, wherein R—CO— is predominately the oleoyl radical.

10. A waxy polish emulsion having improved properties with respect to levelling and gloss resulting from the incorporation into said emulsion of 5% to 30%, by weight of a material selected from the class consisting of waxes and wax-like resins, of a reaction product of (a) a water-soluble amine, and (b) a compound corresponding to the formula R—CO—NH—X—OCO—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a polycarboxylic acid, and $n$ is an integer from 1 to 3.

11. A waxy polish emulsion having improved properties with respect to levelling and gloss resulting from the incorporation into said emulsion of 5% to 30%, by weight of a material selected from the class consisting of waxes and wax-like resins, of a reaction product of (a) a water-soluble amine, and (b) a compound in the form of an amide of an alcohol non-tertiary amine wherein a reactive hydrogen of said amine is replaced by a fatty acid acyl radical containing from 8 to 24 carbon atoms, and wherein a different reactive hydrogen of said amine is replaced by an acyl radical of a polycarboxylic acid, said latter acyl radical being represented by the formula —OC—Y(—COOH)$_n$ wherein Y is the residue of a polycarboxylic acid, and $n$ is an integer from 1 to 3.

12. A wax polish emulsion having improved properties with respect to levelling and gloss resulting from the incorporation into said emulsion of 5% to 30%, by weight of the wax, of a reaction product of (a) a water-soluble amine, and (b) a compound corresponding to the formula R—CO—O—X—NH—OC—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a polycarboxylic acid, and $n$ is an integer from 1 to 3.

13. A wax polish emulsion having improved properties with respect to levelling and gloss resulting from the incorporation into said emulsion of from 5% to 30%, by weight of the wax, of a reaction product of (a) an amine selected from the group consisting of morpholine and methoxy propyl amine, and (b) a compound corresponding to the formula R—CO—NH—X—OCO—Y(—COOH)$_n$ where R—CO— is a fatty acid acyl radical containing from 12 to 18 carbon atoms, X is the carbon-hydrogen residue of a water-soluble alcohol non-tertiary amine, Y is the residue of a polycarboxylic acid containing from 4 to 8 carbon atoms, and $n$ is an integer from 1 to 3.

14. A carnauba wax polish emulsion having improved properties with respect to levelling and gloss resulting from the incorporation into said emulsion of 10% to 20%, by weight of said wax, of a reaction product of (a) an amine selected from the group consisting of morpholine and methoxy propyl amine, and (b) a compound corresponding to the formula $$R—CO—NH—X—OCO—Y(—COOH)_n$$

where R—CO— is a fatty acid acyl radical containing from 12 to 18 carbon atoms, X is the carbon-hydrogen residue of a water-soluble alcohol non-tertiary amine, Y is the residue of a water-soluble polycarboxylic acid containing from 4 to 8 carbon atoms, and n is an integer from 1 to 3.

15. The carnauba wax polish emulsion of claim 14, wherein R—CO— is predominately the oleoyl radical.

16. A wax polish emulsion having improved properties with respect to levelling and gloss resulting from the incorporation into said emulsion of 5% to 30%, by weight of the wax, of a reaction product of (a) an amine selected from the group consisting of morpholine and methoxy propyl amine, and (b) a compound corresponding to the formula $$R—CO—NH—X—OCO—CH=CH—COOH$$

where R—CO— is a fatty acid acyl radical containing from 12 to 18 carbon atoms, and X is the carbon-hydrogen residue of a hydroxy-alkyl primary amine selected from the group consisting of monoethanolamine and monoisopropanolamine.

17. A carnauba wax polish emulsion having improved properties with respect to levelling and gloss resulting from the incorporation into said emulsion of 10% to 20%, by weight of said wax, of a reaction product of (a) an amine selected from the group consisting of morpholine and methoxy propyl amine, and (b) a compound corresponding to the formula $$R—CO—NH—X—OCO—CH=CH—COOH$$

where R—CO— is a fatty acid acyl radical containing from 12 to 18 carbon atoms, and X is the carbon-hydrogen residue of a hydroxy-alkyl primary amine selected from the group consisting of monoethanolamine and monoisopropanolamine.

18. The carnauba wax polish emulsion of claim 17, wherein R—CO— is predominately the oleoyl radical.

References Cited in the file of this patent
UNITED STATES PATENTS

| | | |
|---|---|---|
| 2,325,062 | Kritchevsky | July 27, 1943 |
| 2,374,474 | Dolian | Apr. 24, 1945 |
| 2,441,842 | Prince | May 18, 1948 |
| 2,599,391 | Katzman | June 3, 1952 |